Figure 1:
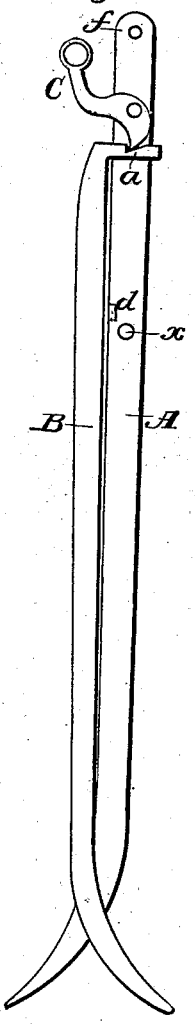
Figure 2:

H FISHER.
Horse Hay Fork.

No. 56,739.

Patented July 31, 1866.

Witnesses
John P. Jacobs
Charles Alexander

Inventor
Henry Fisher
per
Alexander & Mason
Attorneys

UNITED STATES PATENT OFFICE.

HENRY FISHER, OF CANTON, OHIO.

IMPROVEMENT IN HORSE HAY-FORKS.

Specification forming part of Letters Patent No. 56,739, dated July 31, 1866.

*To all whom it may concern:*

Be it known that I, HENRY FISHER, of Canton, county of Stark, and State of Ohio, have invented certain new and useful Improvements in Hay-Forks; and I do hereby declare that the following is a full, clear, and exact description of the same, reference being had to the accompanying drawings and the letters of reference marked thereon, making a part of this specification.

The trouble experienced by farmers in storing their hay from wagons and stacks into the barn or other receptacle has caused much experimenting by inventors to obviate the difficulty. Many of the patented hay-elevators are very impracticable and complicated, while others are so expensive as to exclude their use by many of the ordinary American farmers.

In presenting this invention I claim to have devised such a one as will come within the means of almost any person. While being simple in its construction, it performs the necessary duties for which it is designed, and is not liable to get out of repair.

In the drawings hereto annexed, A represents a metallic bar, which has a hook, and is sharpened at the lower end. This bar has two notches, $b$ and $d$, (see Figures 1 and 3,) made on the inner side, the former, $b$, being near the top of said bar, while the latter, $d$, is a short distance below the former. The purposes of these notches will be hereinafter set forth.

B represents a bar of metal similar to the bar A, but somewhat shorter than the same. This bar B is crooked at the lower end, forming a hook of equal size to the bar A. Bar B is attached to bar A by means of a loop, $a$, formed at the top of said bar B. At the point in the bar B where the hook is formed there is an oblong slot, as seen at H, to allow the hook of bar A to pass through the same.

C represents a crooked lever, which is pivoted near its center, and to the bar A, near the top. This lever holds the bar B to the bar A by means of a notch in the loop $a$, as is shown in Fig. 1.

Figure 3:
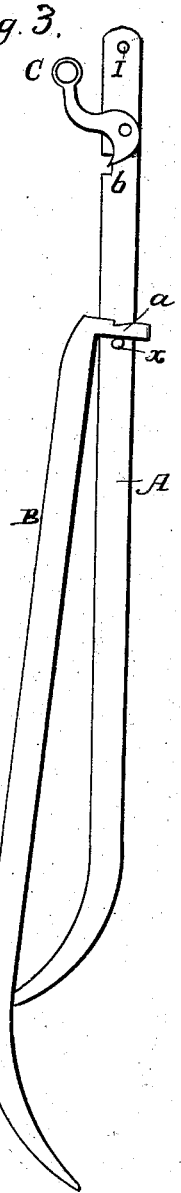

In operating this invention, the same is attached to a beam by a rope which is secured within the opening $f$ at the extreme top of bar A. Near the beam there is a pulley, while the end of the rope passes over said pulley, and the end held by some person on the ground or in the place where the hay is received. Attached to the lever C is a rope, held by some person, to operate the fork. The fork is lowered into the hay in the position shown in Fig. 3, the bars A and B then being united in the form shown in Fig. 1, with the hay resting upon the points of the said bars. The device is then elevated the required distance, the lever being worked so that the bar B will pass from the notch $b$ and drop by its own weight, carrying the hay with it. The bar B, in dropping, is caught about one-quarter the way on the bar A by a pin, $x$, and the notch $d$, and the fork assumes the position as shown in Fig. 3, being ready for another raising of the hay.

Having thus fully described my invention, what I claim as new, and desire to secure by Letters Patent, is—

The bars A and B, with crooked points, being provided with the lever C, when arranged and used substantially as and for the purpose herein set forth.

As evidence that I claim the foregoing I have hereunto set my hand in the presence of two witnesses.

HENRY FISHER.

Witnesses:
 ISAAC HAZLETT,
 WM. W. NUTT.